(12) United States Patent    (10) Patent No.:     US 8,814,416 B1
Davis                        (45) Date of Patent:    Aug. 26, 2014

(54) BROAD COLOR SPACE LIGHT-EMITTING DIODE (LED) EDGELIGHT

(75) Inventor: Joshua V. Davis, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 445 days.

(21) Appl. No.: 13/216,382

(22) Filed: Aug. 24, 2011

(51) Int. Cl.
*F21V 7/04* (2006.01)

(52) U.S. Cl.
CPC ............ *G02B 6/0073* (2013.01); *G02B 6/0068* (2013.01)
USPC ........ 362/612; 362/23.1; 362/23.17; 362/231; 362/613

(58) Field of Classification Search
CPC .... G01D 11/28; G02B 6/0055; G02B 6/0068; G02B 6/0073
USPC .......... 349/65, 68; 362/23.1, 23.17, 231, 612, 362/613
See application file for complete search history.

(56) References Cited

U.S. PATENT DOCUMENTS 8,007,159 B2 * 8/2011 Ohashi et al. ................. 362/612
2008/0062715 A1 * 3/2008 Park et al. .................... 362/612

* cited by examiner

*Primary Examiner* — Stephen F Husar
(74) *Attorney, Agent, or Firm* — Donna P. Suchy; Daniel M. Barbieri

(57) ABSTRACT

The present invention is directed to a broad color space LED edgelight. The edgelight may implement high efficiency white LEDs and multi-color LED assemblies, wherein the white LEDs and multi-color LED assemblies may be configured in an alternating arrangement on the edgelight strip. The edgelight embodiments disclosed herein may provide good edge uniformity and improved broad color space performance.

12 Claims, 5 Drawing Sheets

BROAD COLOR SPACE LIGHT-EMITTING DIODE (LED) EDGELIGHT

FIELD OF THE INVENTION

The present invention relates to the field of displays and particularly to a broad color space light-emitting diode (LED) edgelight for displays.

BACKGROUND OF THE INVENTION

A number of currently-implemented LED edgelights, such as for Active Matrix Liquid Crystal Displays (AMLCDs), may not provide a desirable level of efficiency and/or performance.

Thus, it would be desirable to provide an LED edgelight which obviates problems associated with current solutions.

SUMMARY OF THE INVENTION

Accordingly, an embodiment of the present invention is directed to a display assembly, including: a display panel; and a backlight module, the backlight module being connected to the display panel, the backlight module being configured for emitting a plurality of light beams and providing the plurality of light beams to the display panel, the backlight module including a light source and a light guide, the light source including a strip and a plurality of light-emitting diode (LED) assemblies being connected to the strip, the plurality of LED assemblies being configured for emitting the plurality of light beams and directing the light beams towards an insertion edge of the light guide, the light guide being configured for receiving the plurality of light beams via the insertion edge of the light guide, the light guide being further configured for providing the plurality of light beams to the display panel for illuminating the display assembly, wherein the plurality of LED assemblies includes: a plurality of white LED assemblies configured for emitting white light; and a plurality of multi-color LED assemblies, the plurality of LED assemblies being spaced apart on the strip and configured such that each of the plurality of white LED assemblies is adjacent to at least one of the multi-color LED assemblies.

An additional embodiment of the present invention is directed to a backlight module for implementation in a display assembly and for illuminating a display panel of the display assembly, said backlight module including: a light source, the light source including a strip and a plurality of light-emitting diode (LED) assemblies being connected to the strip, the plurality of LED assemblies being configured for emitting a plurality of light beams; and a light guide, the light guide being configured for receiving the plurality of light beams, the light guide being further configured for providing the plurality of light beams to the display panel for illuminating the display assembly, wherein the plurality of LED assemblies includes: a plurality of white LED assemblies configured for emitting white light; and a plurality of multi-color LED assemblies, the plurality of LED assemblies being spaced apart on the strip and configured such that each of the plurality of white LED assemblies is adjacent to at least one of the multi-color LED assemblies.

A further embodiment of the present invention is directed to a light source for implementation in a backlight module of a display assembly and for illuminating a display panel of the display assembly, said light source including: a strip; and a plurality of light-emitting diode (LED) assemblies being connected to the strip, the plurality of LED assemblies being configured for emitting a plurality of light beams, wherein the plurality of LED assemblies includes: a plurality of white LED assemblies configured for emitting white light; and a plurality of multi-color LED assemblies, the plurality of LED assemblies being spaced apart on the strip and configured such that each of the plurality of white LED assemblies is adjacent to at least one of the multi-color LED assemblies.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Traditional LED edgelights for Active Matrix Liquid Crystal Displays (AMLCDs) typically use white only (ex. —white) LEDs. Some other LED edgelights for AMLCDs may use added color (ex. —color) LEDs, along with white only LEDs. The LED edgelights which use the combination of added color LEDs and white only LEDs may experience edge uniformity issues due to packaging space limitations. Also, the LED edgelights which use both added color LEDs and white only LEDs may fall short of the broad color space that is achievable in direct view type backlights due to their inability to use enough distinct LED color inputs in the tightly constrained space available. Thus, it would be desirable to provide an LED edgelight which obviates problems associated with current solutions.

Figure 1:
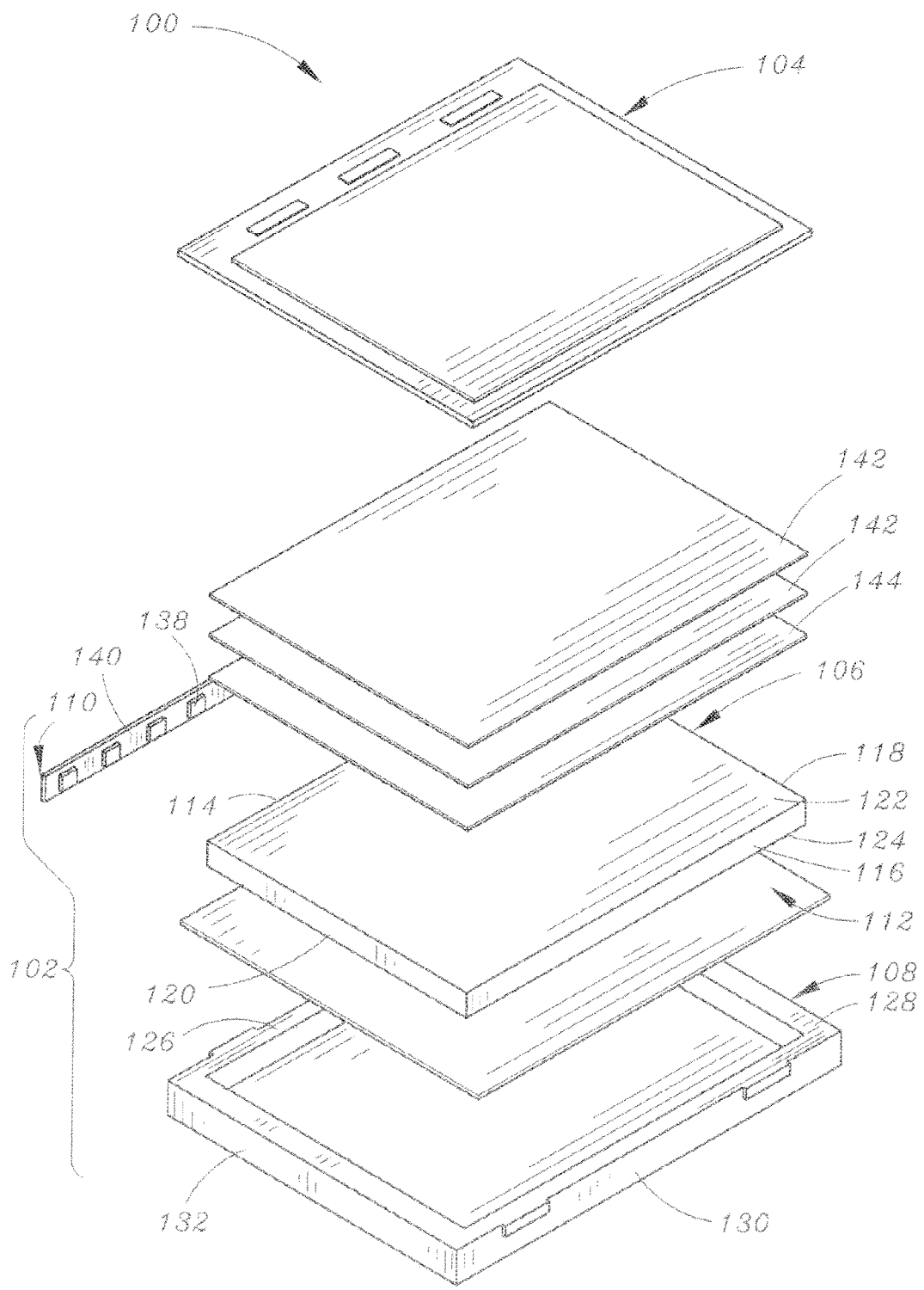
FIG. 1 is an exploded isometric view of a display assembly in accordance with an exemplary embodiment of the present invention.
Figure 2:
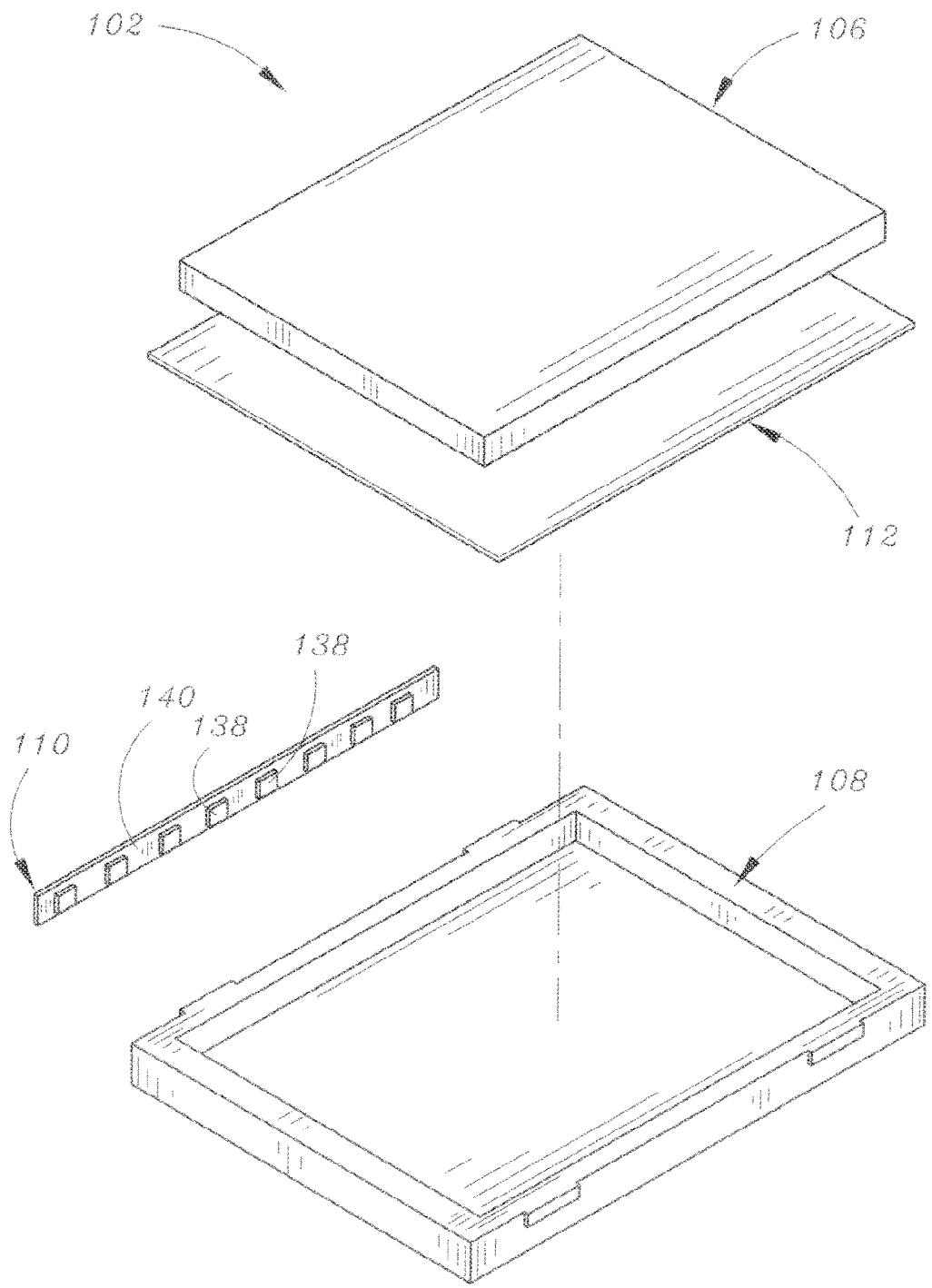
FIG. 2 is an exploded isometric view of a backlight module for the display assembly of FIG. 1, in accordance with an exemplary embodiment of the present invention.
Figure 3:
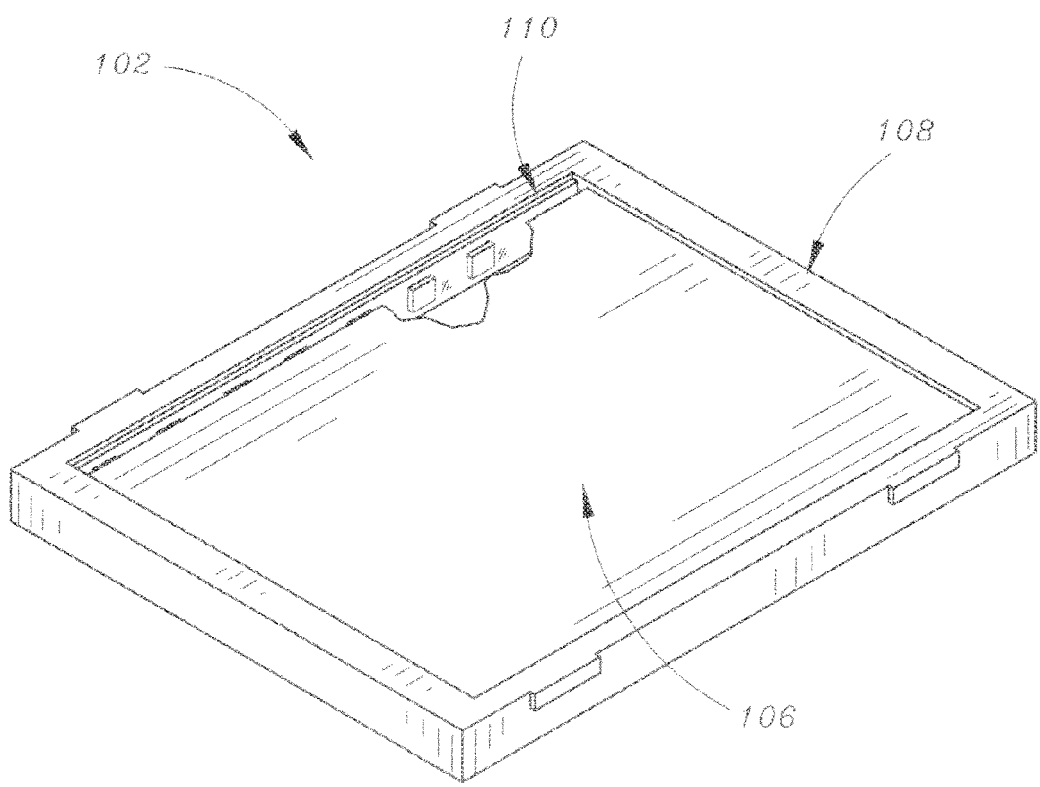
FIG. 3 is an assembled, cutaway view of the backlight module of FIG. 2, in accordance with an exemplary embodiment of the present invention.

Referring generally to FIGS. 1-3, a display system/display assembly (ex. —a Liquid Crystal Display (LCD) assembly; an AMLCD assembly) in accordance with exemplary embodiments of the present disclosure are shown. In a current embodiment of the present disclosure, the LCD assembly 100 may include a backlight module 102 and an LCD panel/LCD/display 104. In further embodiments, the backlight module 102 may be connected to the LCD 104 and may be configured for providing light to/illuminating/directing light to the LCD 104.

In current embodiments of the present disclosure, the backlight module 102 may include a light guide plate/light guide 106, a frame 108, a light source (ex. —edgelight) 110 and a reflector film 112. As shown in the illustrated embodiments, the light guide 106 may be a generally rectangular-shaped plate having a first edge/side 114, a second edge/side 116, a third edge/side 118, a fourth edge/side 120, a top surface 122 (ex. —configured for being oriented generally towards the LCD 104 of the assembly 100, as shown in FIG. 1) and a bottom surface 124 (ex. —configured for being oriented generally away from the LCD 104 of the assembly, as shown in FIG. 1). For example, the first edge/side 114 may be a light incident surface/insertion edge (ex. —bottom edge) and the top surface 122 may be a light emitting surface.

In exemplary embodiments of the present invention, the frame 108 may be correspondingly shaped (ex. —may be generally rectangular-shaped) for/configured for at least partially receiving the light guide plate/light guide 106. For instance, the frame 108 may include a first side/wall 126, a second side/wall 128, a third side/wall 130 and a fourth side/wall 132, said walls (126, 128, 130, 132) forming a cavity/recess for receiving the light guide plate/light guide 106.

In current embodiments of the present invention, the light source 110 may include a plurality of light-emitting diode (LED) assemblies 138 and a strip 140. In further embodiments, the plurality of LED assemblies 138 may be adhered to/connected to/mounted upon the strip 140 in a linear arrangement and the LED assemblies 138 may be spaced apart relative to each other. For instance, the strip 140 may be formed of and/or may include: metal, printed circuit board material, a metal carrier, a metal housing, and/or the like. FIG. 2 is an assembled view of the backlight module 102 of the LCD assembly 100. During assembly of the backlight module 102, the light guide plate 106 may be placed into the frame 108. Further, the light source 110 may be placed into a space formed between the light incident surface 114 of the light guide/light guide plate 106 and a first side/wall 126 of the frame 108. Further, the LED assemblies 138 may be directed toward/oriented toward/faced toward the light incident surface 114. In additional embodiments, the reflector film/reflector film sheet 112 may be placed into the frame 108 prior to placing the light guide 106 into the frame 108.

In exemplary embodiments of the present invention, the LCD assembly 100 may include one or more sheets of brightness enhancement film 142 and a sheet of diffusing film 144. For instance, during assembly, after the light guide plate 106 is placed into the frame 108, the diffusing film sheet 144 may be placed into the frame 108, then the brightness enhancement film sheets 142 may be placed into the frame 108, such that the diffusing film sheet 144 is positioned between the brightness enhancement film sheets 142 and the light guide plate/light guide 106. The LCD panel 104 is then connected to the backlight module 102, such that the brightness enhancement film sheets 142 and diffusing film sheet 144 are positioned between the LCD panel 104 and the light guide plate 106, as shown in FIG. 1.

As mentioned above, the light source 110 may be implemented for generating/providing light, which may be provided/directed to an LCD panel 104 of the LCD assembly 100 via the light guide 106. Also, as mentioned above, the LED assemblies 138 of the light source 110 may be located or positioned proximal to an edge/light incident surface 114 (ex. —bottom edge) of the light guide 106 of the LCD assembly 100. For example, the LCD assembly 100 may be suitable for use in a computing device. In further alternative embodiments, the LCD assembly 100 may include at least a second light source (not shown), constructed as the light source 110 describe above, the second light source may be placed into a space formed between the second edge/side 116 (opposite the light incident surface 114) of the light guide/light guide plate 106 and the third side/wall 130 of the frame 108. Further, the LED assemblies 138 may be directed toward/oriented toward/faced toward the second edge/side 116 of the light guide plate 106 for directing light into the light guide 106 via the second side 116.

Figure 4A:
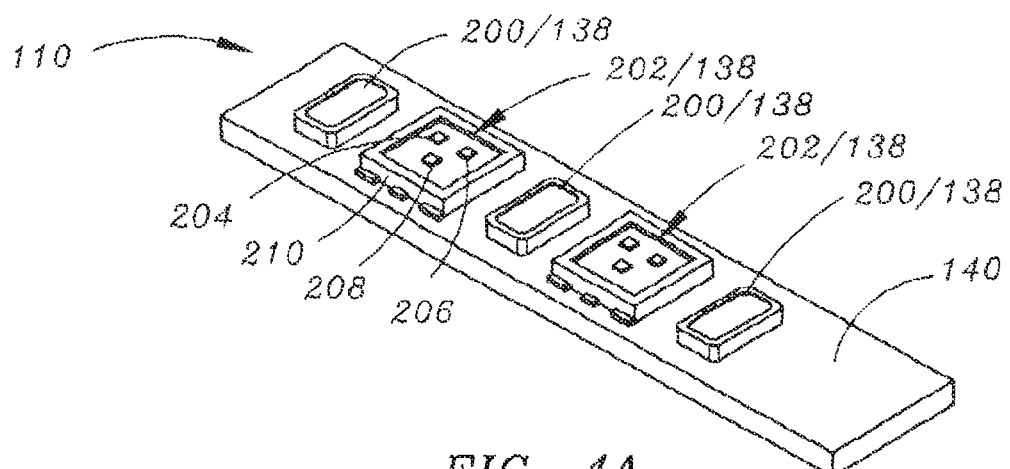
FIG. 4A is an isometric view of a light source, the light source implementing white LED assemblies and multi-color LED assemblies in accordance with an exemplary embodiment of the present invention.

In exemplary embodiments, the light source 110 may implement various types of LED assemblies 138 as shown in FIGS. 4A through 4F. In an embodiment of the present disclosure, as shown in FIG. 4A, the light source 110 may implement a plurality of LED assemblies which emit white light (ex—white LED assemblies; white LEDs; high efficiency white LEDs; white only LEDs; discrete high efficiency white emitters) 200. For example, each of the white LED assemblies may include a component assembly which utilizes an efficient core LED emitter die, which is typically (but not restricted to being) blue in color, in combination with a phosphor encapsulant to produce white light. Further, the light source may implement a plurality of LED assemblies which are multi-color LED assemblies 202. For example, the multi-color LED assemblies 202 may include integrated, multi-die color components, which may include a plurality of individual color emitters, such a blue light emitter 204, a green light emitter 206, and a red light emitter 208 each connected to (ex. —hosted within) a same (ex. —a single, shared) component package (ex. —LED package) 210. In the embodiment shown in FIG. 4A, the LED assemblies 138 are arranged on the strip 140 such that the white LED assemblies 200 are alternated with the multi-color LED assemblies 202 on the strip 140 as shown.

Figure 4B:
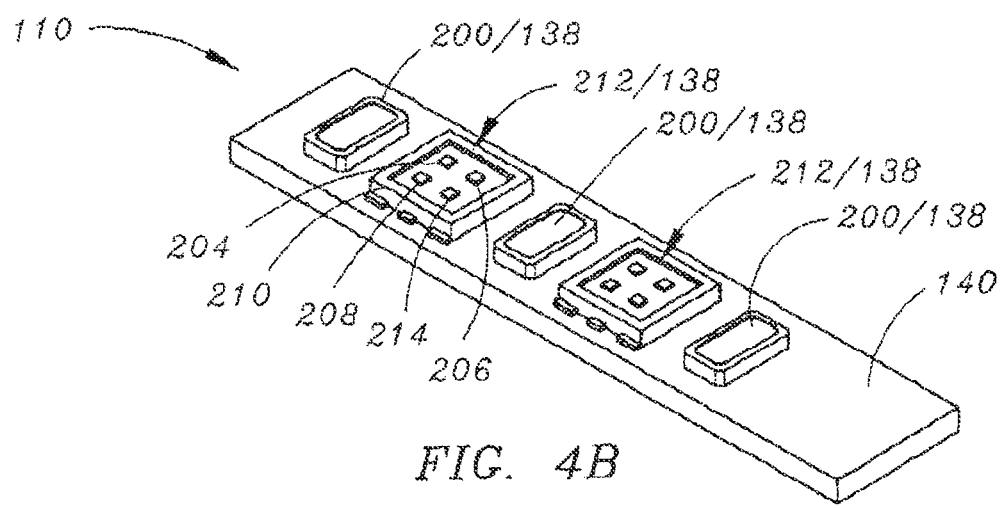
FIG. 4B is an isometric view of a light source, the light source implementing white LED assemblies and multi-color LED assemblies, the multi-color assemblies including a white light emitter in accordance with a further exemplary embodiment of the present invention.

In a further embodiment of the present disclosure, as shown in FIG. 4B, the light source 110 may implement a plurality of white LED assemblies 200 and a plurality of multi-color LED assemblies 212, the multi-color LED assemblies 212 may include integrated, multi-die color components, which may include a plurality of individual color emitters, such as a blue light emitter 204, a green light emitter 206, a red light emitter 208 and a white light emitter 214 each connected to (ex. —hosted within) a same (ex. —a single, shared) component package 210. In the embodiment shown in FIG. 4B, the LED assemblies 138 are arranged on the strip 140 such that the white LED assemblies 200 are alternated with the multi-color LED assemblies 212 on the strip 140 as shown. In a further alternative embodiment, as shown in FIG. 4F, the light source 110 may implement only the plurality of multi-color LED assemblies 212 (ex. —and not any white LED assemblies), which are connected to the strip 140. It should be noted that although the multi-color LED assemblies (202, 212) may integrate individual color die into a singular host package, each discrete die of the multi-color LED assemblies (ex. —multi-die assemblies) may still be independently controlled. It should further be noted that, in embodiments disclosed herein, the white LED assemblies 200 may be configured in a multiple die (ex. —multi-die) configuration or in a single-die configuration.

Figure 4C:
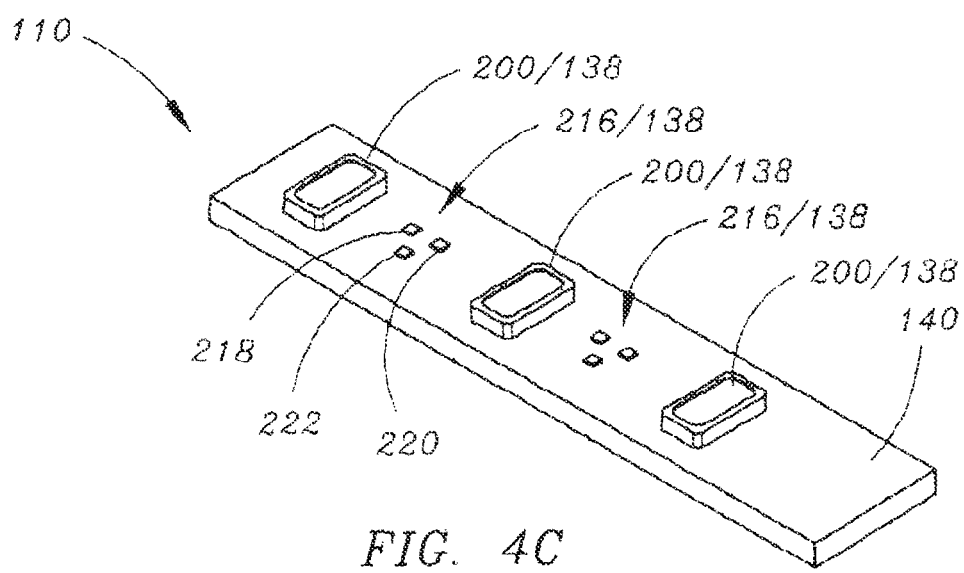
FIG. 4C is an isometric view of a light source, the light source implementing white LED assemblies and multi-color LED assemblies, the multi-color LED assemblies including a group of closely-spaced individual or discrete single-die color LEDs, each with autonomous component packaging, in accordance with a further exemplary embodiment of the present invention.
Figure 4D:
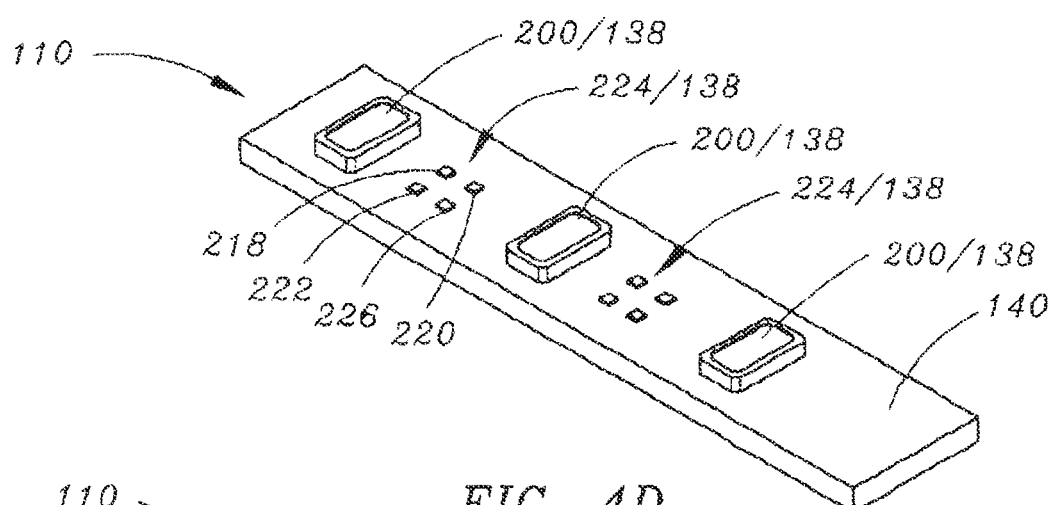
FIG. 4D is an isometric view of a light source, the light source implementing white LED assemblies and multi-color LED assemblies, the multi-color LED assemblies including a group of closely-spaced individual or discrete single-die color LEDs, each with autonomous component packaging, one of the single-die color LEDs being a white light emitter in accordance with a further exemplary embodiment of the present invention.
Figure 4E:
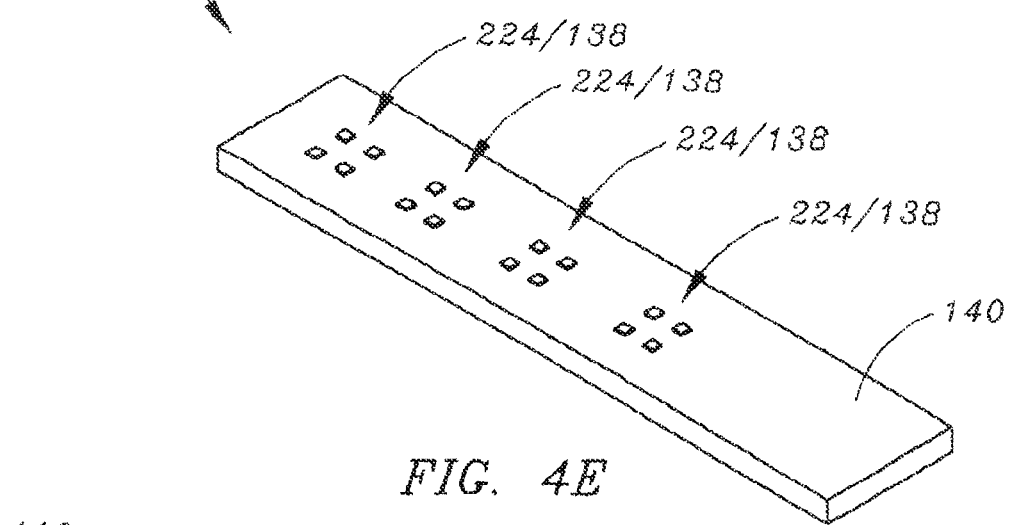
FIG. 4E is an isometric view of a light source, the light source implementing only multi-color LED assemblies (ex.—and not white LED assemblies), the multi-color LED assemblies including a group of closely-spaced individual or discrete single-die color LEDs, each with autonomous component packaging, in accordance with a further exemplary embodiment of the present invention.
Figure 4F:
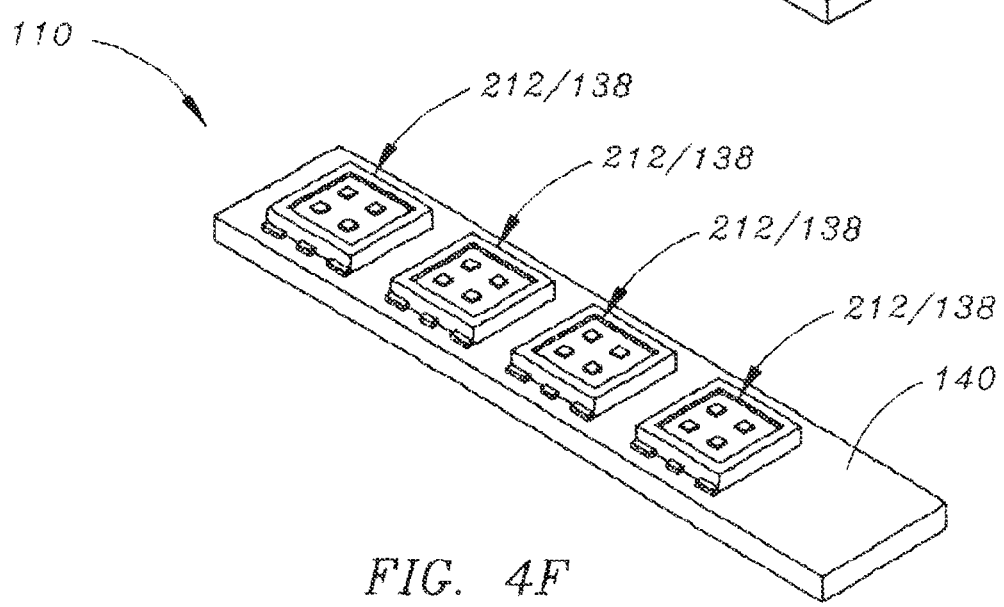
FIG. 4F is an isometric view of a light source, the light source implementing only multi-color LED assemblies (ex.—and not white LED assemblies), the multi-color LED assemblies including a white light emitter, in accordance with a further exemplary embodiment of the present invention.

In a further exemplary embodiment of the present disclosure, as shown in FIG. 4C, the light source 110 may implement a plurality of white LED assemblies 200 and plurality of multi-color LED assemblies 216. Each of the multi-color LED assemblies 216 may include a plurality (ex. —a group) of individual or discrete single-die color LEDs which are spaced closely together (ex. —are closely-grouped), such as a blue light emitter 218, a green light emitter 220, and a red light emitter 222. In the embodiment shown in FIG. 4C, the LED assemblies 138 are arranged on the strip 140 such that the white LED assemblies 200 are alternated with the multi-color LED assemblies 216 as shown. Each of the discrete single-die color LEDs (218, 220, 222) of the multi-color LED assemblies (216) may have autonomous component packaging. In still further embodiments, as shown in FIG. 4D, the light source 110 may implement a plurality of white LED assemblies 200 and a plurality of multi-color LED assemblies 224, each of the multi-color LED assemblies 224 including a plurality (ex. —group) of individual or discrete single-die color LEDs which are spaced closely together (ex. —are closely-grouped), such as a blue light emitter 218, a green light emitter 220, a red light emitter 222 and a white light emitter 226. In the embodiment shown in FIG. 4D, the LED assemblies 138 are arranged on the strip 140 such that white LED assemblies 200 are alternated with the multi-color LED assemblies 224 as shown. Each of the discrete single-die LEDs (218, 220, 222 and 226) of the multi-color LED assemblies (224) may have autonomous component packaging. In a further exemplary embodiment of the present disclosure, as shown in FIG. 4E, the light source 110 may implement only the plurality of multi-color LED assemblies 224 (ex. —and not any white LED assemblies), which are connected to the strip 140.

As described above, the light source embodiments of the present disclosure may implement various combinations of LED assemblies for promoting superior edge uniformity and for providing very broad color space performance. Further, modern multi-die LED assemblies may offer increased efficiency and system power reductions when used in combination with white LEDs. Still further, by addressing the packaging density obstacle and associated edge uniformity issues, variants of multi-die edgelit backlights may deliver unmatched broad color space performance. Further, the above-described light source embodiments may provide differentiating advantages in edgelighting of both Commercial Off-The-Shelf (COTS) waveguides and custom waveguides for backlighting AMLCDs.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A display assembly, comprising:
   a display panel; and
   a backlight module, the backlight module being connected to the display panel, the backlight module being configured for emitting a plurality of light beams and providing the plurality of light beams to the display panel, the backlight module including a light source and a light guide, the light source including a strip and a plurality of light-emitting diode (LED) assemblies being connected to the strip, the plurality of LED assemblies being configured for emitting the plurality of light beams and directing the light beams towards an insertion edge of the light guide, the light guide being configured for receiving the plurality of light beams via the insertion edge of the light guide, the light guide being further configured for providing the plurality of light beams to the display panel for illuminating the display assembly,
   wherein the plurality of LED assemblies includes: a plurality of white LED assemblies configured for emitting white light; and a plurality of multi-color LED assemblies, the plurality of LED assemblies being spaced apart on the strip and configured such that each of the plurality of white LED assemblies is adjacent to at least one of the multi-color LED assemblies, wherein each of the plurality of multi-color LED assemblies includes a plurality of integrated, multi-die color components which include a plurality of individual color emitters, the plurality of color emitters being connected to a single component package, wherein the plurality of color emitters includes a red light emitter, a blue light emitter, a green light emitter and a white light emitter.

2. A display assembly as claimed in claim 1, wherein the strip of the light source is formed of one of: metal and printed circuit board material.

3. A display assembly, comprising:
   a display panel; and
   a backlight module, the backlight module being connected to the display panel, the backlight module being configured for emitting a plurality of light beams and providing the plurality of light beams to the display panel, the backlight module including a light source and a light guide, the light source including a strip and a plurality of light-emitting diode (LED) assemblies being connected to the strip, the plurality of LED assemblies being configured for emitting the plurality of light beams and directing the light beams towards an insertion edge of the light guide, the light guide being configured for receiving the plurality of light beams via the insertion edge of the light guide, the light guide being further configured for providing the plurality of light beams to the display panel for illuminating the display assembly,
   wherein the plurality of LED assemblies includes: a plurality of white LED assemblies configured for emitting white light; and a plurality of multi-color LED assemblies, the plurality of LED assemblies being spaced apart on the strip and configured such that each of the plurality of white LED assemblies is adjacent to at least one of the multi-color LED assemblies, wherein each of the plurality of multi-color LED assemblies includes a plurality of discrete single-die color LEDs, each of the single-die color LEDs including autonomous component packaging, the plurality of single-die color LEDs includes a red light emitter, a blue light emitter, and a green light emitter.

4. A display assembly as claimed in claim 3, wherein the plurality of single-die color LEDs further includes a white light emitter.

5. A backlight module for implementation in a display assembly and for illuminating a display panel of the display assembly, said backlight module comprising:
   a light source, the light source including a strip and a plurality of light-emitting diode (LED) assemblies being connected to the strip, the plurality of LED assemblies being configured for emitting a plurality of light beams; and
   a light guide, the light guide being configured for receiving the plurality of light beams, the light guide being further configured for providing the plurality of light beams to the display panel for illuminating the display assembly,
   wherein the plurality of LED assemblies includes: a plurality of white LED assemblies configured for emitting white light; and a plurality of multi-color LED assemblies, the plurality of LED assemblies being spaced apart on the strip and configured such that each of the plurality of white LED assemblies is adjacent to at least one of the multi-color LED assemblies, wherein each of the plurality of multi-color LED assemblies includes a plurality of integrated, multi-die color components which include a plurality of individual color emitters, the plurality of color emitters being connected to a single component package, the plurality of color emitters includes a red light emitter, a blue light emitter, a green light emitter and a white light emitter.

6. A backlight module as claimed in claim 5, wherein the plurality of single-die color LEDs includes a red light emitter, a blue light emitter, and a green light emitter.

7. A backlight module for implementation in a display assembly and for illuminating a display panel of the display assembly, said backlight module comprising:
   a light source, the light source including a strip and a plurality of light-emitting diode (LED) assemblies being connected to the strip, the plurality of LED assemblies being configured for emitting a plurality of light beams; and
   a light guide, the light guide being configured for receiving the plurality of light beams, the light guide being further configured for providing the plurality of light beams to the display panel for illuminating the display assembly,
   wherein the plurality of LED assemblies includes: a plurality of white LED assemblies configured for emitting white light; and a plurality of multi-color LED assemblies, the plurality of LED assemblies being spaced apart on the strip and configured such that each of the plurality of white LED assemblies is adjacent to at least one of the multi-color LED assemblies, wherein each of the plurality of multi-color LED assemblies includes a plurality of discrete single-die color LEDs, each of the single-die color LEDs including autonomous component packaging, the plurality of single-die color LEDs includes a red light emitter, a blue light emitter, a green light emitter and a white light emitter.

8. A light source for implementation in a backlight module of a display assembly and for illuminating a display panel of the display assembly, said light source comprising:
   a strip; and
   a plurality of light-emitting diode (LED) assemblies being connected to the strip, the plurality of LED assemblies being configured for emitting a plurality of light beams,
   wherein the plurality of LED assemblies includes: a plurality of white LED assemblies configured for emitting white light; and a plurality of multi-color LED assemblies, the plurality of LED assemblies being spaced apart on the strip and configured such that each of the plurality of white LED assemblies is adjacent to at least one of the multi-color LED assemblies.

9. A backlight module as claimed in claim 8, wherein each of the plurality of multi-color LED assemblies includes a plurality of integrated, multi-die color components which include a plurality of individual color emitters, the plurality of color emitters being connected to a single component package.

10. A backlight module as claimed in claim 8, wherein each of the plurality of multi-color LED assemblies includes a plurality of discrete single-die color LEDs, each of the single-die color LEDs including autonomous component packaging.

11. A backlight module as claimed in claim 9, wherein the plurality of color emitters includes a red light emitter, a blue light emitter and a green light emitter.

12. A backlight module as claimed in claim 11, wherein the plurality of color emitters further includes a white light emitter.

* * * * *